United States Patent
David et al.

(10) Patent No.: US 9,052,957 B2
(45) Date of Patent: Jun. 9, 2015

(54) METHOD AND SYSTEM FOR CONDUCTING INTENSIVE MULTITASK AND MULTIFLOW CALCULATION IN REAL-TIME

(75) Inventors: Raphaël David, Bures sur Yvette (FR); David Vincent, Versailles (FR); Nicolas Ventroux, Bures sur Yvette (FR); Thierry Collette, Palaiseau (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 1141 days.

(21) Appl. No.: 12/084,495

(22) PCT Filed: Jun. 8, 2006

(86) PCT No.: PCT/FR2006/050535
§ 371 (c)(1),
(2), (4) Date: Mar. 18, 2009

(87) PCT Pub. No.: WO2007/051935
PCT Pub. Date: May 10, 2007

(65) Prior Publication Data
US 2009/0327610 A1    Dec. 31, 2009

(30) Foreign Application Priority Data
Nov. 4, 2005 (FR) .................................... 05 11266

(51) Int. Cl.
*G06F 15/00* (2006.01)
*G06F 15/76* (2006.01)
(Continued)

(52) U.S. Cl.
CPC ............ *G06F 9/5044* (2013.01); *G06F 9/3851* (2013.01); *G06F 9/3885* (2013.01); *G06F 9/544* (2013.01)

(58) Field of Classification Search
USPC .................................................. 712/34, 220
See application file for complete search history.

(56) References Cited

U.S. PATENT DOCUMENTS 4,862,407 A * 8/1989 Fette et al. ...................... 712/35
5,001,624 A * 3/1991 Hoffman et al. ................. 710/5
(Continued)

FOREIGN PATENT DOCUMENTS

EP    0 794 492 A2    9/1997
EP    1 416 377 A1    5/2004

OTHER PUBLICATIONS

Russo, V. et al:, Association for Computing Machinery: "Process Management and Exception Handling in Multiprocessor Operating Systems Using Object-Oriented Design Techniques," Proceedings of the Object-Oriented Programming Systems, Languages and Applications Conference. (OOPSLA). San Diego, Sep. 25-30, 1988. Special Issue of SIGPLAN Notices, vol. 23, No. 11, Nov. 1988, Reading, ACM, US, vol. Conf> 3, Sep. 25, 1988, pp. 248-258. (XP000299832).

(Continued)

*Primary Examiner* — George Giroux
(74) *Attorney, Agent, or Firm* — Preti Flaherty Beliveau & Pachios LLP

(57) ABSTRACT

The system for conducting intensive multitask and multi-stream calculation in real time comprises a central processor core (SPP) for supporting the system software and comprising a control unit (ESCU) for assigning threads of an application, the non-critical threads being run by the central processor core (SPP), whereas the intensive or specialized threads are assigned to an auxiliary processing part (APP) comprising a set of N auxiliary calculation units (APU0, ..., APUN-1) that are optimized for fast processing of certain operations, a memory space (SMS) shared by the auxiliary calculation units (APU0, ..., APUN-1) via an internal network and a unit (ACU) for controlling and assigning the auxiliary resources. The various elements of the system are arranged in such a manner that communication between the various auxiliary calculation units (APU0, ..., APUN-1) or between those auxiliary calculation units (APU0, ..., APUN-1) and the central processor core (SPP) is effected via the shared memory space (SMS) and the internal network.

43 Claims, 9 Drawing Sheets

(51) Int. Cl.
  *G06F 9/50* (2006.01)
  *G06F 9/38* (2006.01)
  *G06F 9/54* (2006.01)

(56) References Cited

U.S. PATENT DOCUMENTS

| | | | |
|---|---|---|---|
| 5,056,000 A | 10/1991 | Chang | |
| 5,239,654 A | 8/1993 | Ing-Simmons et al. | |
| 5,682,512 A * | 10/1997 | Tetrick | 711/202 |
| 5,822,553 A * | 10/1998 | Gifford et al. | 710/305 |
| 6,532,530 B1 * | 3/2003 | Kim et al. | 712/35 |
| 6,883,085 B2 * | 4/2005 | Deveruex | 712/34 |
| 2002/0013872 A1 * | 1/2002 | Yamada | 710/240 |
| 2005/0132345 A1 * | 6/2005 | Pessolano | 717/159 |
| 2006/0101245 A1 * | 5/2006 | Nair et al. | 712/221 |

OTHER PUBLICATIONS

Bartz, Rendering and Visualization in Parallel Environments; IEEE Visualization 2001 tutorial 3 on "Rendering and Visualization in Parallel Environments".

* cited by examiner

Prior Art

Prior Art

Prior Art

US 9,052,957 B2

METHOD AND SYSTEM FOR CONDUCTING INTENSIVE MULTITASK AND MULTIFLOW CALCULATION IN REAL-TIME

This application is a §371 national phase filing of PCT/FR2006/050535 filed Jun. 8, 2006, and claims priority to French application No. 0511266 filed Nov. 4, 2005.

TECHNICAL FIELD

The present invention consists in a method and a system for conducting intensive multitask and multiflow calculation in real time.

The invention applies more particularly to embedded multiprocessor architectures.

BACKGROUND

The invention aims to propose a processing solution for systems having the following properties:

High calculation power: the complexity of embedded applications is increasing all the time. This is explained in particular by the drive to integrate ever more functions into embedded systems (combination of multimedia, gaming, telecommunications, and positioning functions in a mobile telephone) and the increasing volumes of data to be processed (capacities of video sensors, high-speed converters, etc.). Embedded systems must further be able to "digest" concurrently multiple streams of information. It is therefore indispensable to collect, distribute and process efficiently all information from the distributed units in the system. This necessity for concurrent processing of a number of information streams combined with the open nature of the systems is also reflected in multitask execution environments.

Flexibility: the target systems are required to be open. Thus any user of the system is free to use it as they wish. The architecture must therefore be sufficiently flexible to support very different utilization scenarios. This openness prevents overall offline optimization of the architecture as the application contents cannot be fully determined at the design stage. Moreover, although some classes of algorithms favor static division of processes with simple control of parallelism (defined offline), others require a dynamic control stream, and this trend is likely to increase with the increasing complexity of embedded applications.

Deep integration into the environment: the systems being developed must also be deeply integrated into their environment. This integration is reflected in severe real time, power consumption, cost, and operating reliability constraints.

Heterogeneous processing: because of the diversity of the applications and the complication of the control streams in embedded systems, a very wide variety of types of processing must cohabit within embedded architectures. Thus intensive calculation tasks run alongside tasks where it is the control aspect that dominates, with very strong interactions between these different elements of applications.

To summarize, the target embedded systems have high capacities for processing heterogeneous data streams, strong possibilities for dynamic adaptation to the environment, and good communications capacities adapted to demand. They are also strongly constrained by the external environment (power consumption, real time, etc.) and are required to be open, meaning that the same product can be intended for more than one use. This includes in particular multi-application systems within which tasks can be created, suspended, destroyed, etc. dynamically (i.e. during execution).

In such systems, envisaging offline optimization of the architecture is a problem as the impossibility of accurately determining the scenarios of use leads to underuse of resources. Conversely, it is preferable to concentrate on online optimization of the calculation structure, eliminating the necessity to predict all utilization scenarios. The impossibility of optimizing the architecture offline imposes the provision of control mechanisms that are very costly in performance terms, however. The object of the present invention is to propose a calculation structure in which integrating dynamic control solutions is not achieved to the detriment of performance.

In the context of the race for performance, the use of parallelism is historically linked to solutions providing the benefits of parallelism at the level of operations or instructions within applications. Despite intense research into defining architectures capable of managing efficiently a high degree of parallelism at the instruction level, the limits of these approaches are all too apparent. At the same time, the complexity of embedded applications makes modeling them in the form of a single control stream extremely difficult or ineffective. Thus users and architecture designers are agreed on emphasizing parallelism at the task level. Consequently, a strong trend at present is the integration onto the same silicon substrate of a number of processor cores, enabling parallel execution of tasks in the same circuit.

In this race for performance, a number of solutions are envisaged classified by the method employed to exploit parallelism. The main models are Simultaneous MultiThreading (SMT), Chip MultiProcessing (CMP), and Chip Multi-Threading (CMT).

For example, the SMT technique is used in the latest generations of Intel, IBM and HP Alpha processors. It uses a plurality of program counters in order to supply the calculation units with instructions from a number of streams of instructions. The interdependency of tasks being limited, instruction level parallelism (ILP) as seen by the processor is increased and processor performance is consequently also increased. Implementing these solutions is difficult, however, and the complexity of the stages for reading and distributing instructions is very high in these solutions. Consequently, these architectures lead to very large circuits, incompatible with the constraints of embedded systems, in particular in terms of cost and power consumption.

FIG. 1A is a block diagram showing the theory of an SMT architecture. Calculation units or functional units FU are fed processing by a unique control resource CP associated with a task assigner TD. In each cycle, the control block CP associated with the task assigner TD assigns instructions to the functional units FU concurrently as a function of the availability of data and any operating problems. The functional units cooperate with a shared memory space SMS.

FIG. 1B shows an example of operation of a structure having four functional units FU. In this figure, each square 1 represents an instruction and the vertical black lines 2 represent the instruction assignment and control tasks.

The squares 3 marked with a cross correspond to time slots that are not used by the functional units because of the dependencies of data or resources.

The CMP solution is generally preferred in embedded systems because of its relatively simple implementation.

The theory of this solution is to distribute tasks concurrently to calculation resources according to their availability. Each calculation resource then executes the tasks assigned to it one after the other. These architectures are divided into two families, homogeneous structures and heterogeneous structures:

Heterogeneous structures: these structures integrate calculation units that are heterogeneous and optimized for a given application domain, the distribution of tasks to these resources being identified beforehand at compilation time. The software partitioning effected at compilation time simplifies the mechanisms for distributing tasks (dynamically) at run time. These application-oriented solutions include in particular the OMAP, VIPER, PNX and Nomadic platforms.

Homogeneous structures: these structures are based on integrating homogeneous calculation units, which can be generalist, as in the IBM Cells platform or the ARM MPCore platform, or optimized for a given application domain, like the CT3400 from Cradle Technologies, optimized for MPEG4-AVC coding/decoding. The former solutions target very wide ranges of problems, whereas the latter solution is optimized for a clearly identified application domain.

FIG. 2A is a block diagram showing the theory of a CMP architecture. The calculation units (functional units) FU that cooperate with a shared memory space SMS are fed processing by a single control resource CP associated with a task assigner TD. The control unit CP associated with the task assigner TD is responsible for determining the tasks ready to be executed. As soon as a calculation resource is released, it is assigned a task that is processed as soon as the data is loaded. These areas 4 are shown cross-hatched in FIG. 2B, which shows an example of operation for a structure with four functional units FU, with squares 1 representing instructions and vertical black lines 2 representing instruction assignment and control tasks.

Multiprocess and CMT architectures are a combination of the previous two models. The CMP concept is extended to authorize execution of multiple tasks on the calculation primitives.

This technology is envisaged essentially in the context of server-type solutions.

FIG. 3A shows a generic CMT architecture model. Calculation units (functional units) FU are fed processing by a single control resource CP associated with a task assigner TD. The functional units FU cooperate with a shared memory space SMS.

FIG. 3B shows one example of the operation of a functional unit FU.

The control unit CP associated with the task assigner TD is responsible for determining the tasks ready to be executed. As soon as a calculation resource is released, it is assigned a task that is processed as soon as the data is loaded. This is represented by the cross-hatched areas 4 in FIG. 3B, whereas the squares 1 represent instructions and the vertical black lines 2 represent instruction assignment and control tasks.

Each calculation resource can manage a number of tasks concurrently. As soon as a task is blocked, for example because of a lack of cache capacity, the functional unit FU replaces it with a new one. Under such circumstances, task switching within the functional unit is not reflected in context loading penalties.

Despite emulation based on these architectures using the parallelism of instruction streams (threads) to enhance performance, these architectures, whether of SMT, CMP or CMT type, address only partially the problems of embedded systems. The main cause of this state of affairs is the lack of distinction between different processing classes cohabiting in an application. Thus processes in which control is strongly dominant are handled in an equivalent manner, on the same processing resource, as regular processing that is critical from the execution time point of view. The calculation resources then having to support regular processing just as much as highly irregular processing, systems based on non-optimized calculation primitives result, and are therefore ill-matched to the application requirements from the three-fold point of view of electrical power consumption, cost/performance trade-off, and reliable operation.

However, a few CMP-type solutions make a distinction between regular and irregular processing. These architectures then integrate calculation resources dedicated to implementing intensive processing. Irregular processing then uses the system software on a generalist processor. Although the integration of calculation resources dedicated to intensive processing allows optimization that improves the performance or energy efficiency of these architectures, the inefficiency of communication between processing tasks and between processing tasks and the system software or control processing loses the benefit of such optimization at system level. Communications between the various elements of the architecture use system buses, attracting high penalties at the latency and bandwidth levels. Because of this, these systems are penalized by the latency accompanying the transmission of control information and by the bit rate, disturbing the transfer of data. These penalties are reflected in a less responsive architecture and by the inability of the system software to optimize the use of the calculation resources.

To minimize this overhead, according to the document US2005/0149937A1, the mechanisms of synchronization between the calculation resources are the responsibility of a dedicated structure, but solutions are no longer applied to the problem of transferring data between those tasks. The document US2004/0088519A1 proposes a solution employing management of task parallelism in the context of high-performance processors, but the proposed solution cannot be applied to embedded systems, in particular for reasons of cost and determinism.

The solutions currently being developed to exploit parallelism at task level therefore cannot address all of the constraints referred to above. SMT-type solutions, for example, are typically based on standard generalist processors onto which an additional control stage has been grafted. However, these solutions do not solve the problems of power consumption and determinism inherent to current generalist processes and, in addition, they increase complexity in order to manage a number of threads concurrently.

Despite the variety of implementations of CMP-type architectures, it is equally difficult to adopt a solution addressing the problems of embedded systems. Firstly, application-oriented solutions do not offer sufficient flexibility and, secondly, more generalist architectures do not offer calculation solutions and continue to be based on costly solutions developed for generalist processors. Similarly, CMT solutions, although extending the parallelism of the architectures, still do not address the power consumption requirements and continue to be confronted by problems of managing the consistency of the data and of communication in the circuit.

BRIEF SUMMARY

The present invention aims to remedy the drawbacks referred to above and in particular to enable a very high level of integration of calculation resources in a processor.

These objects are achieved by a system for conducting intensive multitask and multiflow calculation in real time characterized in that it comprises a central processor core for supporting the system software and comprising a control unit for assigning light processes (threads) of an application, the non-critical threads being run by the central processor core, whereas the intensive or specialized threads are assigned to an auxiliary processing part comprising a set of N auxiliary calculation units that are optimized for fast processing of certain operations, a memory space shared by the auxiliary calculation units via an internal network and a unit for controlling and assigning the auxiliary resources, responsible firstly for assigning streams of individual instructions corresponding to intensive or specialized threads, to the auxiliary processing units in parallel, and secondly for controlling execution and synchronization of these streams of instructions and managing the execution contexts of the streams of instructions, and in that the various elements of the system are arranged in such a manner that communication between at least some of the various auxiliary calculation units or between those auxiliary calculation units and the central processor core is effected via the shared memory space and the internal network.

The system can comprise a system bus connected to the central processor core.

The system advantageously further comprises a mass memory for storing all data and programs manipulated by the auxiliary calculation units.

A main memory controller can be associated with the mass memory.

The system can further comprise input-output controllers connected to at least one input-output peripheral. The input-output signals are made available to the other elements of the system via the shared memory space SMS and can therefore be processed by the system in critical time.

The auxiliary calculation units can comprise units selected from programmable units, reconfigurable units, and dedicated units.

The shared memory space can comprise multiple memory resources and an interconnection network for uniting all these resources and this shared memory space stores all the data manipulated in the auxiliary calculation units.

The shared memory space can further comprise a memory space controller responsible for establishing a link between the calculation resources and the memory resources of the shared memory space.

The shared processor core can further comprise a calculation unit, a memory unit and a loading unit.

The control unit can include additional instructions for controlling the auxiliary processing part.

The loading unit can integrate an additional register queue for exchanging data between the central processor core and the auxiliary processing part.

The number N of auxiliary calculation units that at any time are each processing only one stream of individual instructions forming part of a task is optimized as a function of the application and can be from 2 to 100, for example.

The auxiliary resource assignment and control unit can be further responsible for at least one management function selected from dynamic power management, fault management, and crisis mode management functions.

In one particular embodiment the system comprises a bus arbiter for managing communication between firstly the system bus and secondly the central processor core and, where appropriate, the inputs-outputs and the mass memory.

In one particular application the system comprises a set of processors connected to a system bus, each processor comprising a central processor core, a set of N auxiliary calculation units, a shared memory space, and an auxiliary resource assignment and control unit.

The system can comprise a system bus arbiter shared between a number of processors for effecting the link with the system bus.

The system can further comprise a mass memory shared between a number of processors.

The invention also consists in a system for conducting intensive multitask and multiflow calculation in real time using at least one processor comprising at least one central processor core, a control unit, a set of N auxiliary calculation units, a memory space shared by the auxiliary calculation units via an internal network, and an auxiliary resources assignment and control unit, characterized in that the central processor core is responsible for system software support and in that the control unit is responsible for assigning light processes (threads) of an application, non-critical threads being executed by the central processor core, whereas intensive or specialized threads are assigned to an auxiliary processing part via the auxiliary resource assignment and control unit, which is responsible firstly for parallel assignment of the streams of individual instructions corresponding to the intensive or specialized tasks to the auxiliary calculation units optimized for fast processing of certain operations and secondly controlling execution and synchronization of those streams of instructions and management of the execution contexts of those streams of instructions, and in that at least some of the data is communicated between the various auxiliary calculation units or between those auxiliary calculation units and the central processor support via the shared memory space and the internal network.

The control unit can control the assignment and control unit of the auxiliary resources by means of standard read/write instructions or standard exceptions.

The control unit can furthermore control the auxiliary resource assignment and control unit by means of specialized instructions dedicated to communication and synchronization operations.

At a given time, an auxiliary calculation unit processes only one stream of individual instructions forming part of a task and each stream of individual instructions is executed on only one auxiliary calculation unit.

All the data and programs manipulated by the auxiliary calculation units are advantageously stored in a mass memory.

According to one particular feature input-output signals can be transmitted in critical time to the auxiliary calculation units via the shared memory space.

The processor can be connected to a system bus.

Under such circumstances, according to one particular feature, communication between, firstly the system bus and, secondly the central processor core and where appropriate the input-output controllers or the mass memory can be managed by a bus arbiter.

A task assigned to the central processor core constituting the standard processor part is processed cycle by cycle on the same central processor core until a specialized instruction is reached that is decoded and generates a command to the assignment and control unit causing the creation of a stream of instructions that is executed in one of the calculation units managed by the assignment and control unit whereas, once the specialized instruction has been decoded and the corresponding command generated, execution of the current task continues in the central processor core, without intervention in the management of the stream of instructions initiated and executed in an auxiliary calculation unit.

If trapping follows an exception, an interrupt or a trap, strong synchronization can be brought about selectively as a function of the type of trapping, in which all components of the processor are synchronized.

If trapping follows an exception, an interrupt or a trap, selective weak synchronization can be effected as a function of the type of trapping, in which only the context corresponding to the standard processing part is synchronized while the auxiliary resource assignment and control unit continues autonomously to execute streams of instructions in the auxiliary calculation units.

If trapping follows a local event in an auxiliary calculation unit, selective local synchronization can be effected whereby the auxiliary calculation unit concerned manages only the trapping and is synchronized independently of the rest of the processor.

Unlike existing solutions, the invention integrates a new coupling mechanism allowing very strong integration of calculation resources in the processor.

The architecture of the system of the invention integrates a first standard processing part (SPP) or subsystem that constitutes a central processor core and a second auxiliary processing part (APP) or subsystem that incorporates in particular the auxiliary calculation units and the unit for controlling and assigning auxiliary resources and the shared memory space.

These two subsystems have radically different properties and functionalities but contribute to the same objective, executing a task. Consequently, these functionalities are very strongly coupled at the data and control levels.

BRIEF DESCRIPTION OF DRAWINGS

Other features and advantages of the invention emerge from the following description of particular embodiments given with reference to the appended drawings, in which.

DETAILED DESCRIPTION

Figure 1A:
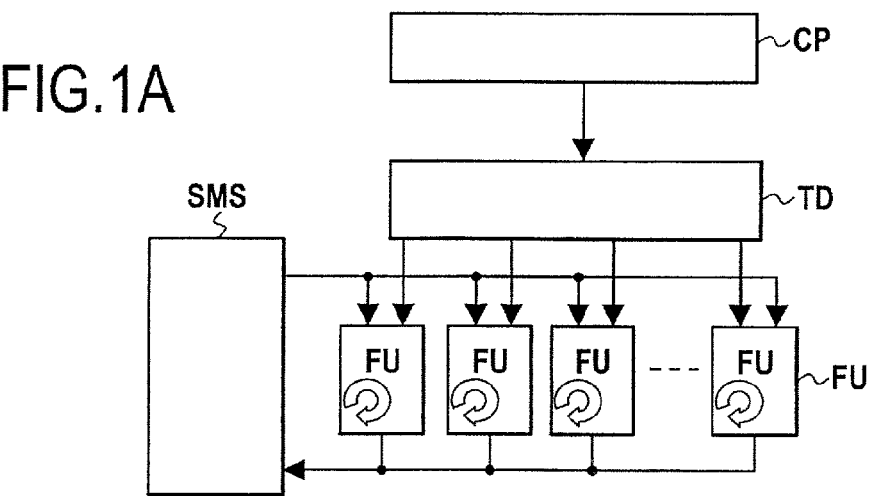
FIGS. 1A and 1B respectively represent a generic SMT architecture model and an example of operation.
Figure 1B:
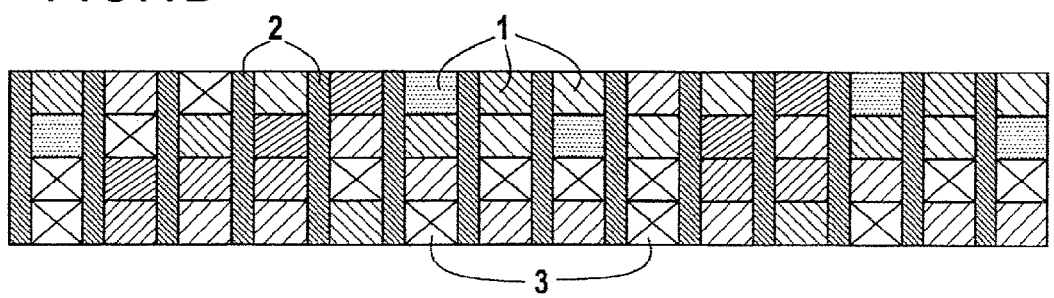
Figure 2A:
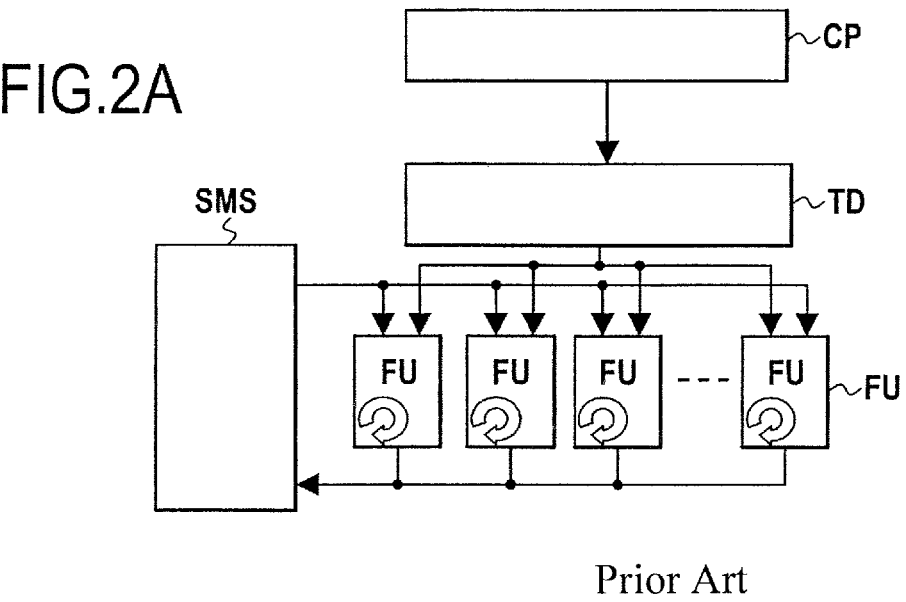
FIGS. 2A and 2B respectively represent a generic CMP architecture model and an example of operation.
Figure 2B:
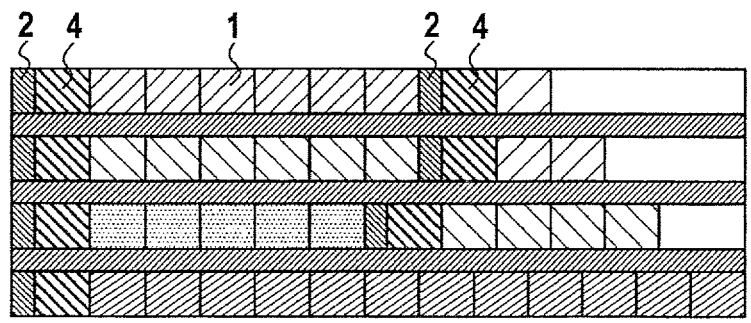
Figure 3A:
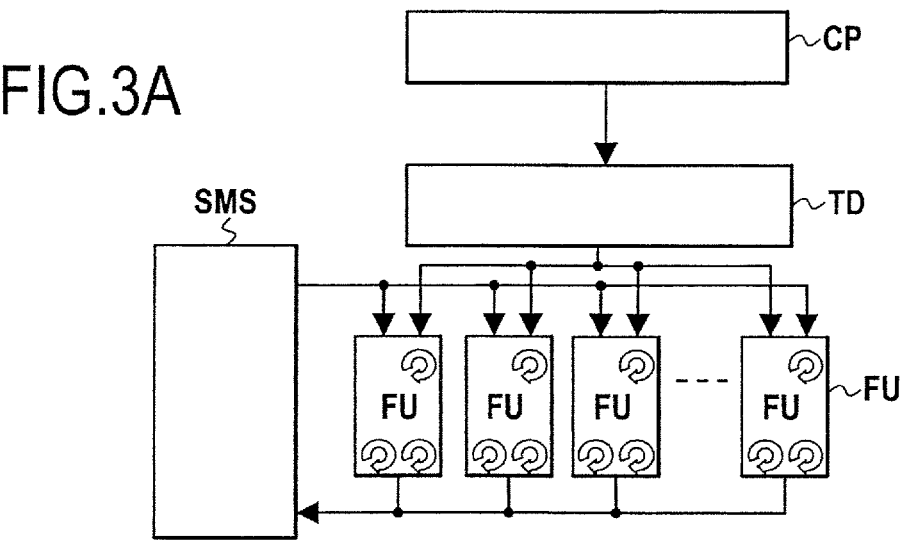
FIGS. 3A and 3B respectively represent a generic CMT architecture model and an example of operation.
Figure 3B:
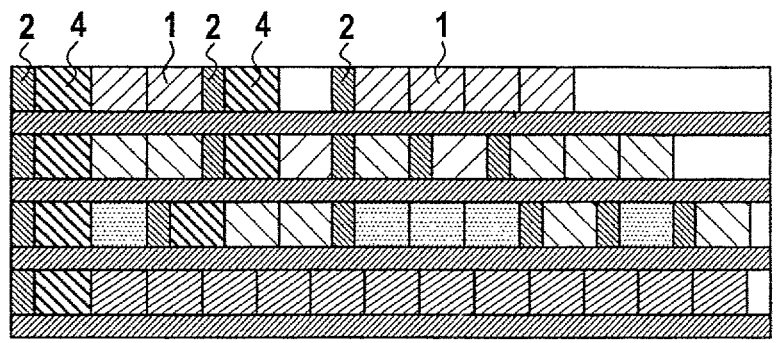
Figure 4:
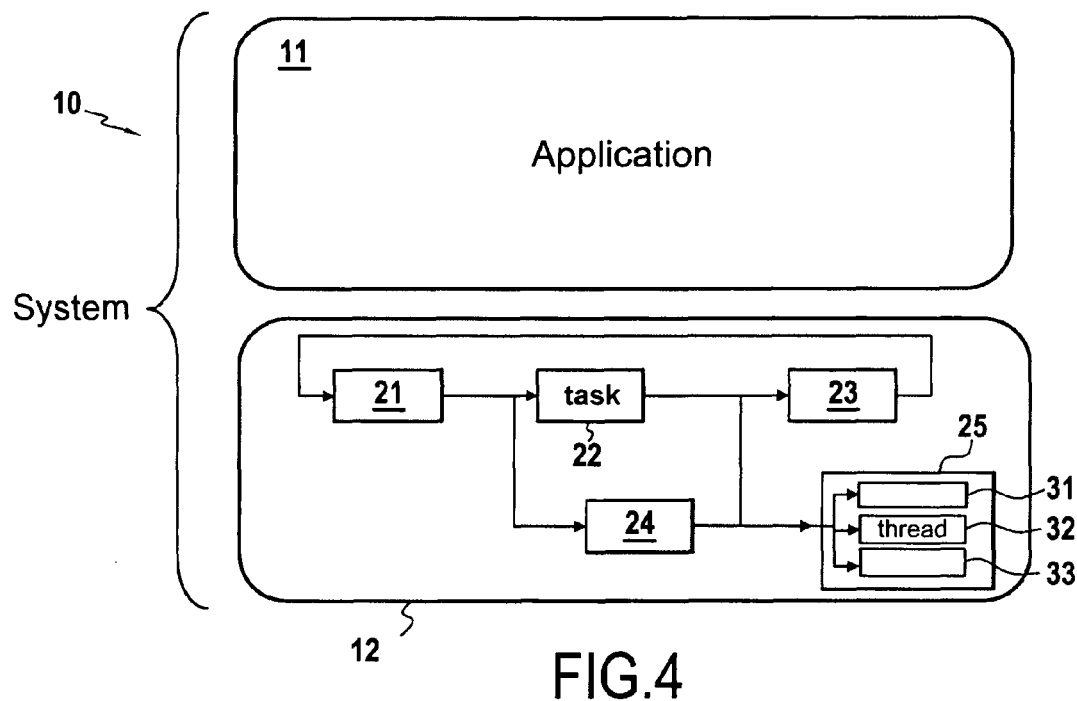
FIG. 4 represents symbolically the division of a system into applications, then into tasks, and finally into streams of instructions (threads)

The division of a system 10 into applications 11, 12, then into tasks 21 to 25, and finally into streams of instructions (threads) 31 to 33, also called "light processes", is explained first with reference to FIG. 4.

An embedded system 10 is typically liable to process a number of applications 11, 12 concurrently. An application refers to a functionality, a service offered by an embedded system. Any application 11, 12 processed in an embedded system can then be divided into the form of tasks 21 to 25 which are strung together according to control dependencies expressed in the application. These tasks 21 to 25 can in turn be divided into operations executed sequentially or into parallel threads 31 to 33, for which concurrent execution is possible.

Thus in the remainder of the description the term threads is used to designate a light process that is an execution stream possibly sharing the whole of its addressing space with other processes.

Figure 5:
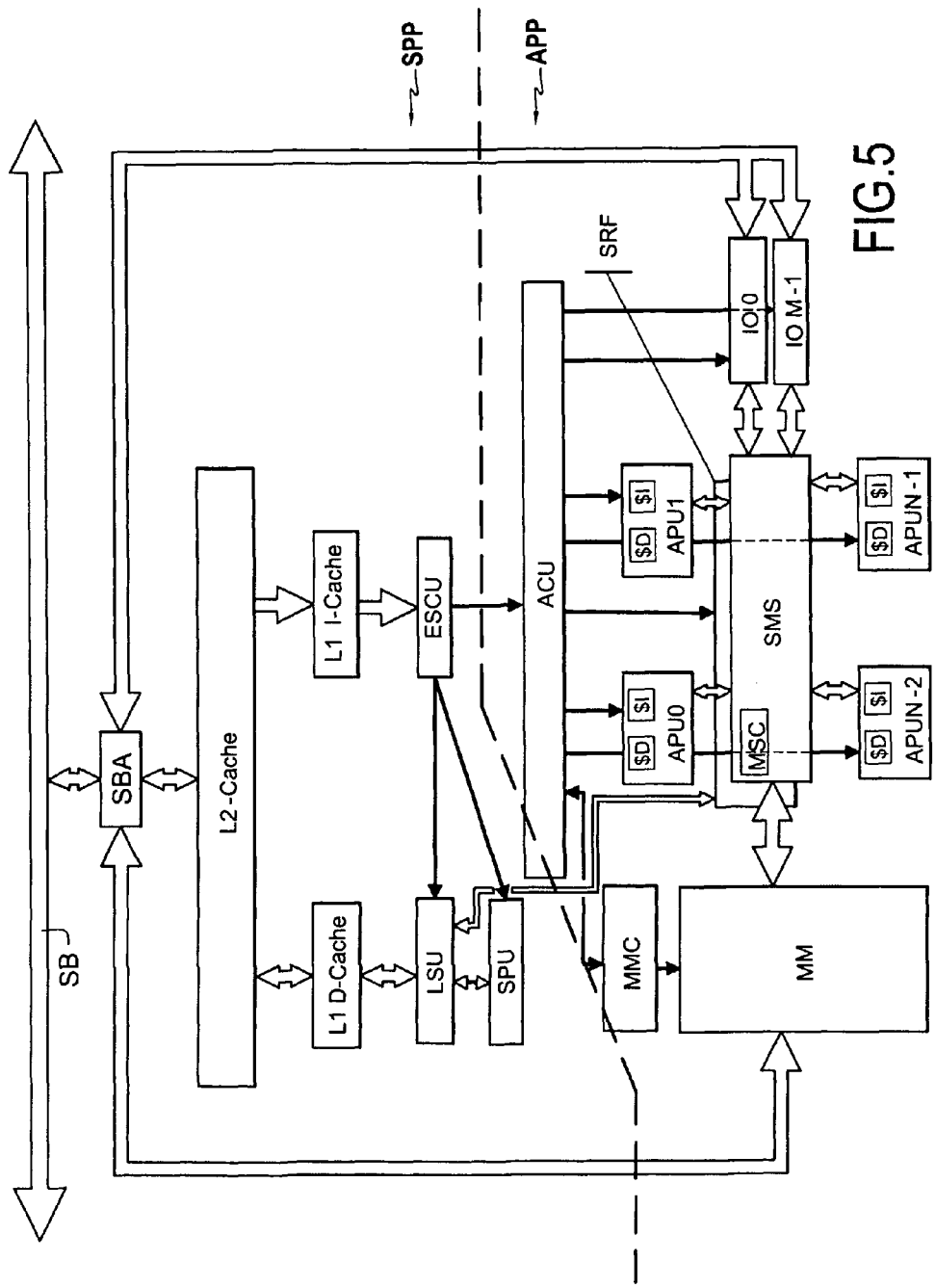
FIG. 5 is a block diagram showing the principal elements of the architecture of a processor of the invention.

FIG. 5 shows an example of a processor architecture of the invention, with a first subsystem consisting of a standard processing part SPP forming a central processor core and a second subsystem consisting of an auxiliary processing part APP.

The standard processing part SPP is generally responsible for executing tasks. This includes both processing instructions constituting the program to be processed and also the system software. Unlike a conventional processor, it can nevertheless call auxiliary execution units APU0, APU1, ..., APUN-2, APUN-1 in the auxiliary processing part APP to process certain application portions requiring very high calculation powers.

The invention implements a specific process in the manner of calling auxiliary calculation units.

The standard processing part SPP is responsible for non-specialized calculations within the applications. It also processes the system software managing resource sharing and task control. It is based on a generalist processor. It is therefore conventionally based on four units:

1. Control unit ESCU: this unit is responsible for reading and decoding instructions. The complexity of this unit varies. It is liable to be able to manage a number of instructions simultaneously and to choose instructions ready to be executed, for execution that is not in application order. This unit can also integrate a certain number of mechanisms for predicting the direction of branches. This unit sends commands to the other units of the architecture as a function of the instruction.

2. Calculation unit SPU: this unit is responsible for carrying out standard calculations identified by the instructions. It can integrate a plurality of calculation resources if the control unit ESCU can manage a plurality of instructions simultaneously.

3. Memory unit: this unit is responsible for storing data and instructions linked to the program. It can be based on two levels of cache memory hierarchy as in a Harvard execution model and with a unified level 2 cache.

This memory unit then comprises cache memories L1 D-Cache and L1 I-Cache of level 1 and a cache memory L2-Cache of level 2.

4. Loading unit LSU: the loading unit is responsible for linking the data stored in the memory and the units manipulated by the calculation unit SPU. This link takes the form of a queue of registers the number of ports that varies as a function of with a number of instructions processed per cycle in the standard processing part SPP.

To provide very close coupling between the standard processing part SPP and the auxiliary processing part APP, a few features can be added to the control unit ESCU and the loading unit LSU compared to a standard central processor core.

Thus the control unit ESCU can comprise additional instructions for controlling the auxiliary processing part APP. For example, these instructions request execution of a critical process. More standard mechanisms can equally be implemented, however, that do not require the introduction of new instructions (for example the memory mapped method of coupling with mapping in memory).

The loading unit LSU can integrate an additional queue of registers. Thus in addition to the standard general register queue, a second queue of registers is integrated into the loading unit LSU and enables exchange of data between the two subsystems SPP and APP.

Figure 8:
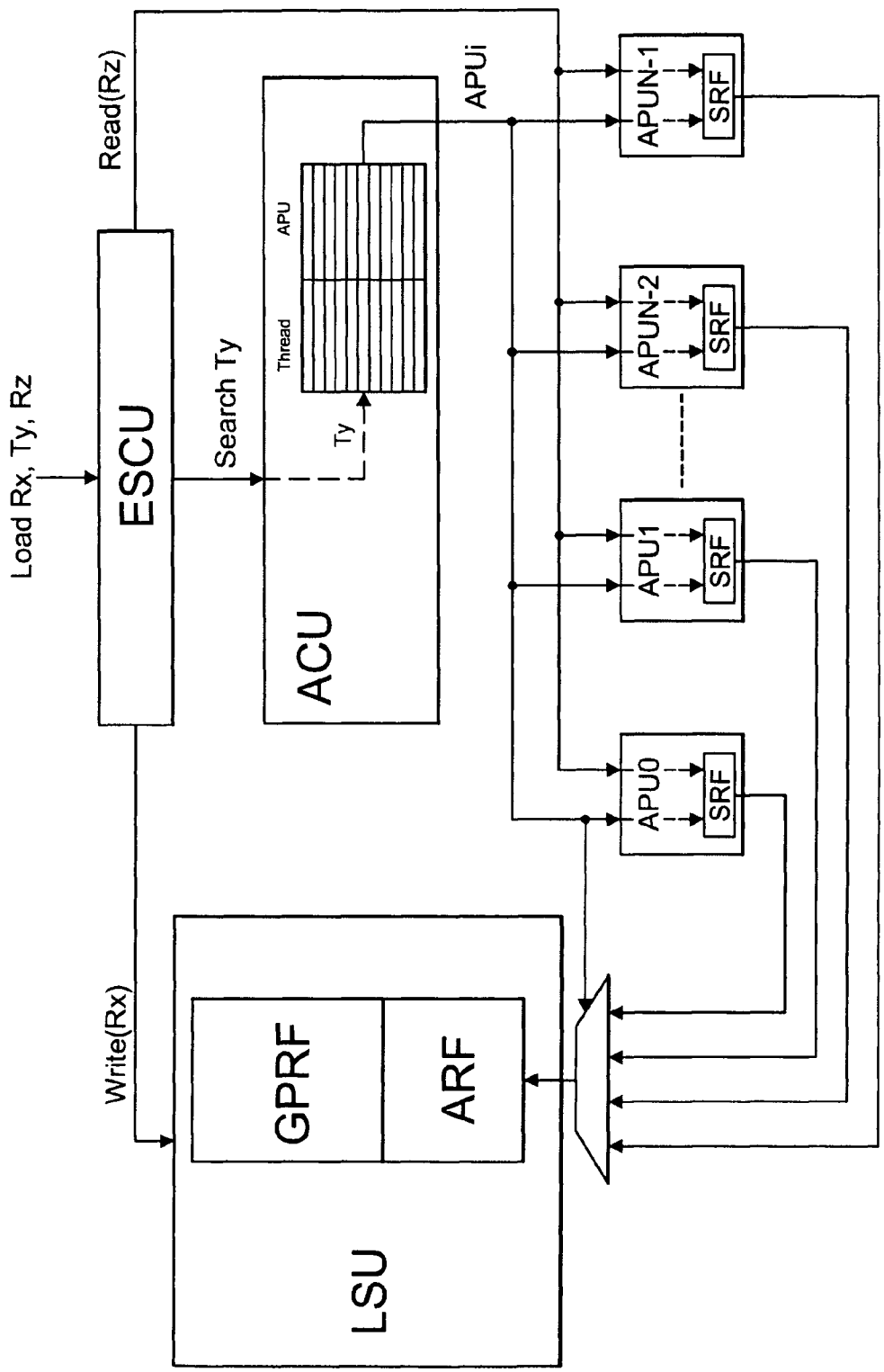
FIG. 8 is a diagram showing a mechanism for transferring data between an auxiliary processing part and a standard processing part.
Figure 9:
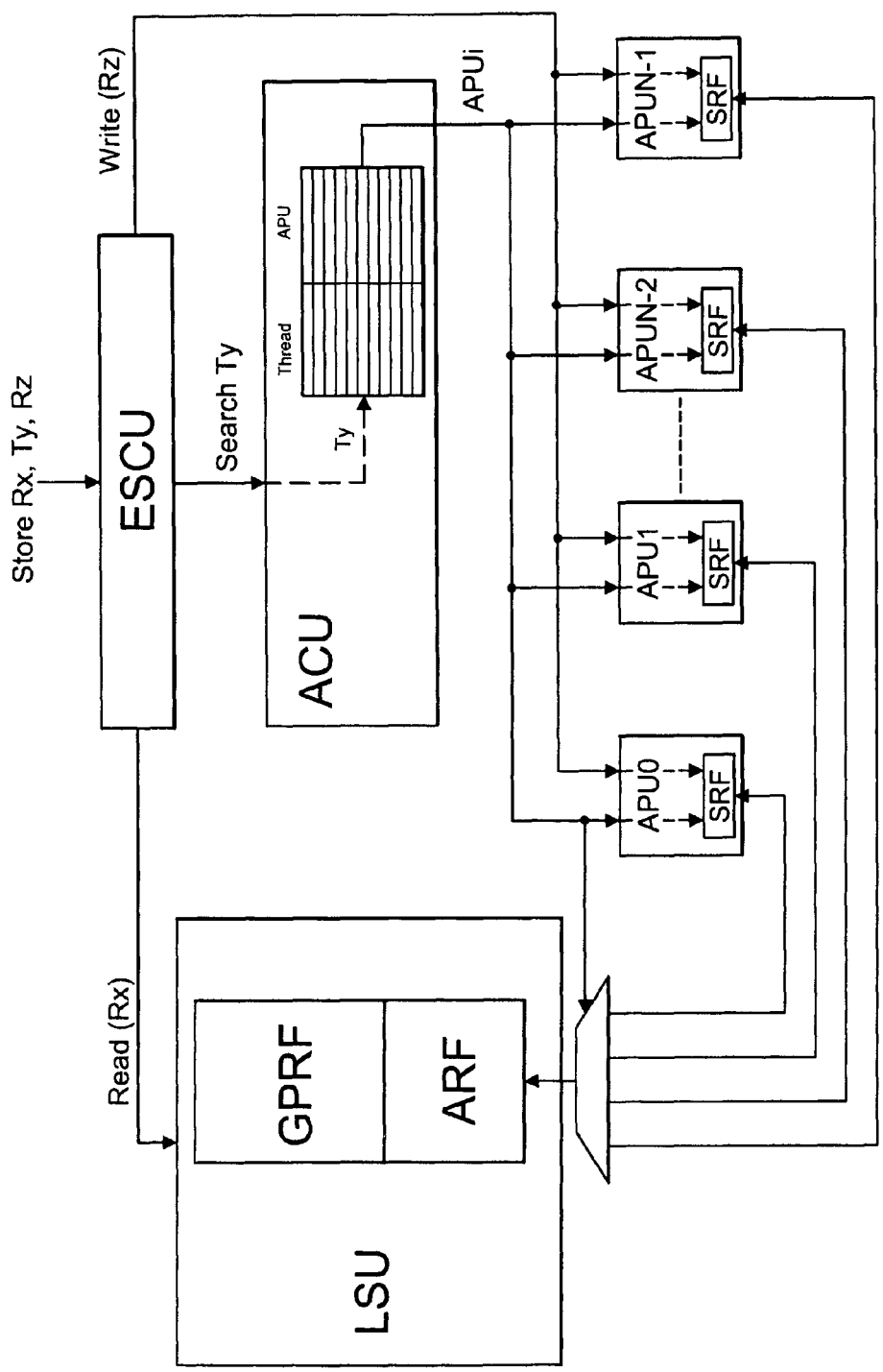
FIG. 9 is a diagram showing a mechanism for transferring data between a standard processing part and an auxiliary processing part.

From a structural point of view, there is no difference at the level of the loading unit LSU between this queue of auxiliary registers ARF and the queue of general registers GPRF (see FIGS. 8 and 9). The processor distinguishes the general registers from the auxiliary registers by their address. Note that this mode of communication between the two subsystems SPP and APP is particularly suitable for transferring small amounts of data.

The auxiliary part APP is responsible for the specialized and/or intensive calculations of the application. It integrates a number of auxiliary calculation units APU0, APU1, . . . , APUN-2, APUN-1 sharing a single memory space SMS. The number N of auxiliary calculation elements APU0, . . . , APUN-1 is not subject to any particular limit. Similarly, it makes no difference whether these calculation elements, which are not distinguished from each other below and are simply denoted APU, are based on synchronous or asynchronous logic. The auxiliary processing part APP therefore lends itself particularly well to implementing GALS (Globally Asynchronous and Locally Synchronous) type structures. An auxiliary part APP typically contains from 4 to 8 calculation elements APU. At any given time, an auxiliary calculation unit APU processes only one thread and a thread is executed on only one auxiliary calculation unit APU.

A set of light processes (threads) is assigned to the auxiliary calculation units APU by the assignment and control unit ACU included in the auxiliary part APP following execution requests from the control unit ESCU. Physical assignment of the threads to the auxiliary calculation units APU, management of their execution, and synchronization including different threads are the responsibility of this assignment and control unit ACU.

The auxiliary processing part APP also integrates critical time input-output controllers IO. These are linked directly to critical time input-output peripherals, for example high-speed analog-to-digital converters, radio-frequency interfaces, video sensors, etc. These M input-output controllers IO0 to IOM-1 are treated by the assignment and control unit ACU as auxiliary calculation units APU. The assignment and control unit ACU must then assign a task to the input-output controller to make it responsible for managing input-output access. Data sent or received comes from or goes to the shared memory space SMS. However, less critical inputs-outputs, for example those corresponding to a keyboard or a mouse, are connected to the standard processing part SPP by more standard means, such as the system bus SB.

The auxiliary processing part APP can further contain a mass memory MM for storing all data and programs manipulated by the auxiliary calculation units APU. This memory MM has its own controller MMC to which the assignment and control unit ACU assigns threads for transfer of data between the system (represented in FIG. 5 by the system bus SB) and the intensive calculation threads. This controller MMC is also involved in transferring data between the shared memory space SMS and the mass memory MM.

The auxiliary calculation units APU are optimized for fast processing of certain operations. They can offer different trade-offs between performance, flexibility, cost or power consumption as a function of their type. The selection of a type of calculation unit is then strongly influenced by the application context.

The auxiliary calculation units can comprise programmable units, reconfigurable units or dedicated units.

Programmable units: this unit type corresponds to generalist processor cores (MIPS, ARM, etc.) or optimized processor cores (DSP, ST2xx, etc.) for embedded calculation. Being optimized for calculation, these units have simplified control structures, for example as a result of eliminating the mechanisms for predicting branches, managing interrupts or virtualizing data. These units can furthermore integrate specialized calculation units such as floating point and/or vector units.

Reconfigurable units: reconfigurable units are equally liable to be used as calculation accelerators. Large-grain structures are preferred because of their capacity to be reconfigured quickly, and the good performance/flexibility trade-off that they are able to offer. Fine-grain structures can also be integrated if great flexibility of use is necessary or if operations working on data of very small size (1 to 4 bits) are liable to be processed. Because of their very low reactivity, i.e. their very long reconfiguration times, these fine-grain resources are liable to be managed differently, for example to prevent their preemption.

Dedicated units: units optimized for certain critical processes can be integrated into the component. These dedicated accelerators assume responsibility for critical processes, for which programmable or reconfigurable solutions do not offer sufficient calculation power. Very fast cryptographic processes or input-output stream management processes are good candidates for this kind of implementation, for example.

Regardless of their type, auxiliary calculation units APU are liable to contain private storage resources. These can be used either to store intermediate data in order to facilitate access thereto and to minimize the bandwidth over the shared memory space, or to store instructions of the program being executed. Programs liable to be executed could moreover also be stored locally in order to accelerate the task assignment phases.

The two subsystems SPP and APP share access to the rest of the system. The communication medium is then the system bus SB and the sharing of this resource is managed by a bus arbiter SBA. Two elements may require access to the system bus in the auxiliary processing part APP, the main memory and the input-output controllers IO. From the point of view of the standard processing part SPP, this access to the system bus SB is used to load the cache memory L2-Cache with data or instructions coming from the mass memory MM or peripherals. In the event of simultaneous access requests from more than one element of the processor, the bus arbiter SBA sequences the access requests in order to guarantee unified communication over the system bus SB.

The bandwidth required for each of these elements changes significantly as a function of the application context. Thus variants of this scheme can be envisaged for application domains in which a number of elements are liable to require a high bandwidth simultaneously. It is thus possible to envisage other schemes in which a second (or even a third) system bus would be added to offer sufficient bandwidth to all elements of the system.

One particular embodiment is described in detail below.

When a task is assigned to the standard processing part SPP by the system software executed on the same SPP, the SPP runs its program in a manner that is entirely conventional for a programmable processor. Instructions are processed cycle by cycle until a specialized instruction is reached. When this is decoded by the control unit ESCU, a command is generated to the assignment and control unit ACU, possibly leading to the creation of a thread to be executed in one of the auxiliary calculation units APU. In this kind of situation, the assignment and control unit ACU will then be responsible for managing execution. Note that this execution model is suited to a programming model in which calculation threads are activated by calling optimized functions in a library. This approach, already widely used in the embedded software field, corresponds to the use of AltiVec or MMX instructions in generalist processors, for example.

Once the specialized instruction has been processed by the control unit ESCU, the standard processing part SPP continues to execute the program, without intervening in the management of the thread initiated in the auxiliary processing part APP. Execution of the program therefore continues until it completes the processing of new specialized instructions, which can among other things cause the creation or destruction of threads, the reading of data generated in the auxiliary processing part APP, etc.

If trapping follows an exception, an interrupt or a trap, three behaviors can be envisaged:

1. Strong synchronization: all the components of the processor are synchronized (for both the subsystems APP and SPP). Because this synchronization phase can take a long time, partial synchronization methods can be defined in order to reduce these penalties in the context of multitask operations. The content of the mass memory could be retained for a time, for example, to accelerate the next change of context, like a victim cache.

2. Weak synchronization: only the context corresponding to the standard processing part SPP is synchronized. In this situation, functions active in the auxiliary calculation units APU are maintained on the auxiliary processing part APP. The assignment and control unit ACU for auxiliary resources is responsible only for their execution. This autonomous operation can therefore continue for as long as the thread does not call information produced or maintained by the standard part of the task (that processed by the standard processing part SPP).

3. Local synchronization: if trapping follows an event local to an auxiliary calculation unit APU, for example division by zero, that unit can manage only the trapping and thus be synchronized independently of the rest of the processor.

The assignment and control unit ACU is responsible for executing specialized instructions from the control unit ESCU. The details of this coupling enabling the control unit ESCU to communicate with the assignment and control unit ACU are shown in model form in FIG. 6.

Figure 6:
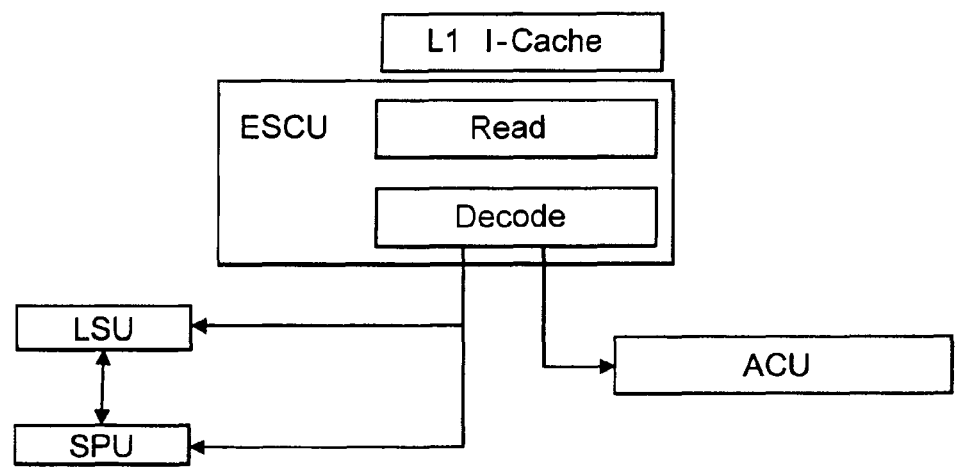
FIG. 6 is a block diagram showing a mechanism coupling an auxiliary processing part and a standard processing part.

Thus FIG. 6 shows the control unit ESCU, the loading unit LSU, and the calculation unit SPU of the standard processing part SPP, together with a portion of the memory unit L1 I-Cache. FIG. 6 also shows the assignment and control unit ACU forming part of the auxiliary processing part APP.

The standard instructions of the standard processing part SPP are read and then decoded, in the reading and decoding stages of the control unit ESCU, respectively, in order to control the loading unit LSU and the calculation unit SPU. Conversely, in the case of specialized instructions, the control unit ESCU redirects the stream of commands to the assignment and control unit ACU.

These specialized instructions can be of different kinds and relate, for example:
  to creating/eliminating threads;
  to eliminating threads associated with a task;
  to transferring data from the main memory MM to the system bus SB or vice-versa; and
  to transferring data between the subsystems SPP and APP.

In assigning a task to the standard processing part SPP, the system software effects virtual assignment of threads to the auxiliary calculation units APU. It is then up to the assignment and control unit ACU to effect this assignment physically and to take into account all of the parameters for determining the best possible assignment. Apart from assignment, the assignment and control unit ACU also manages synchronization between threads and access to critical shared resources. This assignment and control unit ACU can also be responsible for supporting the system software, for example by managing only preemptions or assuming responsibility for updating lists of tasks.

Because of these functions, the assignment and control unit ACU must have available the execution context of each of the threads being executed in the auxiliary processing part APP. At the time of weak synchronization, the assignment and control unit ACU alone is responsible for the evolution of the threads. Consequently, if the task is reassigned to the standard processing part SPP, it is necessary to inform it as to the state of advance of the calculation threads. This enables the standard processing part SPP not to reactivate threads that have not terminated but are in the process of execution in the auxiliary processing part APP. The availability of a local context in the assignment and control unit ACU guarantees a consistent state if a task is assigned to the processor. This is all the more true if the tasks are not executed in order in the standard processing part SPP.

Over and above the basic services, the assignment and control unit ACU can also be responsible for functions more specific to the application domains. These functions include dynamic power management, fault management and "crisis mode" management.

Figure 7:
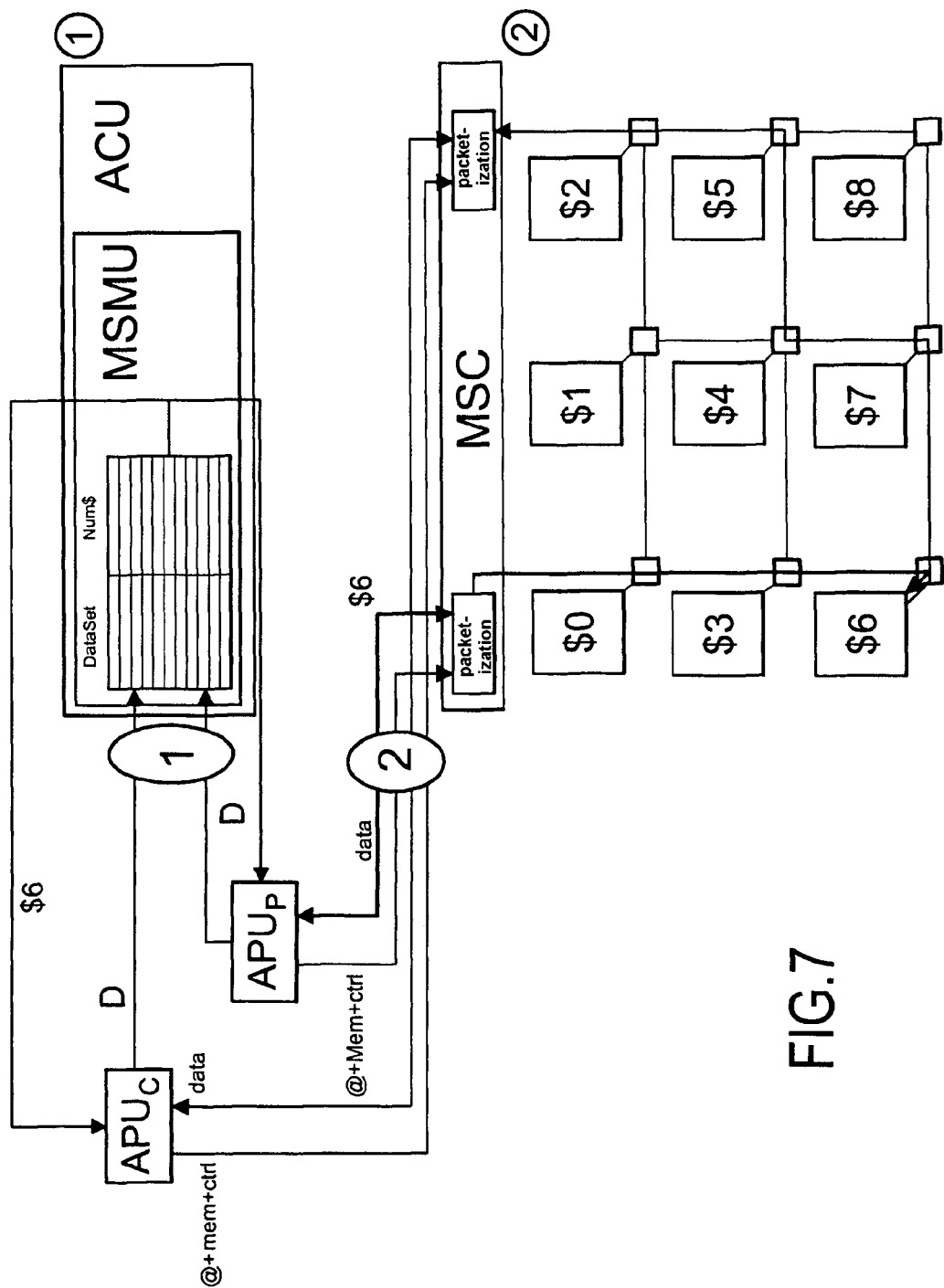
FIG. 7 is a diagram showing a mechanism for accessing data in an auxiliary processing part.

All data manipulated in the auxiliary calculation units APU is stored in a shared memory space SMS. The shared memory space SMS consists of multiple memory resources and an interconnection network for uniting all these resources in one and the same space. A memory space controller MSC is responsible for establishing a link between the calculation resources and the memory resources. The assignment and control unit ACU is used to supply certain information for linking the virtual addresses in the shared memory space, manipulated by the auxiliary calculation units APU (corresponding to the name of a variable and to a position in that variable, for example image name and pixel index) and the physical address to be propagated to the memory resource used. FIG. 7 shows the data access mechanism for a data transfer between a producer auxiliary calculation unit APU denoted $APU_P$ and a consumer auxiliary calculation unit APU denoted $APU_C$. This mechanism for access to data in the auxiliary processing part APP is divided into two steps, identified by the circles 1 and 2 in FIG. 7.

The first phase of accessing data is effected only when an auxiliary calculation unit APU accesses a variable for the first time. In this situation, there is no link between the data and the memory that contains it. To obtain that information, the auxiliary calculation unit APU interrogates the assignment and control unit ACU. The ACU incorporates a memory space management unit MSMU performing this function by associating with the name of a variable the memory that stores it. When the data has been identified in this unit, the management unit MSMU sends the unit the identifier of the memory storing the variable. Conversely, if an auxiliary calculation unit APU attempts to write data that has no reference (when writing that variable for the first time, for example), the management unit MSMU assumes responsibility for assigning it a memory from among the memory elements available in the shared memory space SMS. Once the memory has been assigned, the unit associating with the name of variable the memory that stores it is updated and the identifier of the memory is sent to the auxiliary calculation unit APU. When an auxiliary calculation unit APU attempts to read data that has no reference (when writing the variable for the first time, for example), the management unit MSMU assumes responsibility for repatriating it (in conjunction with the main memory controller MMC) and assigning it in memory from among the memory elements available in the shared memory space SMS. When permanent data is written (final result), the corresponding entry in the unit associating with the name of a variable memory that stores it is freed and a request for the data to be repatriated into the mass memory is sent to the main memory controller MMC.

The second phase of accessing data is systematically performed as it establishes the link between the auxiliary calculation unit APU and the memory containing the data. If the auxiliary calculation unit APU knows the memory it wishes to access, it transfers that information to the shared memory space SMS controller in the same cycle time as the address of the data required and the memory control signals. The memory space controller MSC then assumes responsibility for routing these signals (and then the returned data) to the appropriate memory. This service can differ as a function of the type of structure retained for interconnecting the memory resources. In the context of a network on a chip like that modeled in FIG. 7, this memory space controller MSC "packetizes" the data, i.e. adds to the data information for routing it in the network. In the context of a crossbar type point-to-point network, the memory space controller MSC is responsible for the hardware configuration of the path to be taken.

Note that management of data addresses at the level of the auxiliary calculation units APU is handled by dedicated input-output units, where appropriate capable of managing more complex data streams and bursty calls, for example. Thus these data management elements are made responsible for recovering the data manipulated by the auxiliary calculation units APU. If access to the data is impossible or slowed down, these control modules can freeze the execution of the thread on the auxiliary calculation unit APU in order to prevent it from attempting to manipulate unstable data.

As a function of the application domain and the resulting shared memory space SMS, it is possible for conflicts to occur during execution, following a number $Nb_{access}$ of requests to access data greater than the number $Nb_{ports}$ of ports of the memory or of a node of the network. This possible slowing down must be taken into account when determining the dimensions of the system, knowing that the memory access time $T_{Access}$ to be considered is given by equation (1):

$$T_{Access} = Tmen \times Sup\left(\frac{Nb_{Access}}{Nb_{Port}}\right) \quad (1)$$

in which $Nb_{access}$ represents the number of accesses;
$Nb_{port}$ represents the number of ports of the shared memory space SMS or a node of the network;
$T_{mem}$ represents the minimum memory access time.

To minimize this overhead, it is possible to increase virtually the number of reports of the memory by duplicating the data in different memory banks and thus enabling simultaneous multiple access. A compromise between data writing time and data reading time must then be determined by the user in order to optimize the overall performance of the system. Note that during any such conflict, no particular access priority policy is implemented. A simple FIFO-type solution is a good way to provide this function of managing conflicts, for example, and guarantees a maximum memory access time.

Note that the memory structure used is of interest because the data is linked to a memory structure and not to a calculation element. Preemption can therefore be achieved very quickly because a change of context does not necessarily imply a transfer of data between calculation resources.

Low-volume data can be exchanged between the auxiliary processing part APP and the standard processing part SPP, as shown in FIG. 5. These data transfers are made explicit directly in the source program that integrates instructions for identifying:
 the direction of the transfer from the auxiliary processing part APP to the standard processing part SPP or vice-versa;
 the target register in the standard part;
 the target thread in the auxiliary processing part; and
 the data of the thread.

Thus reading the instruction LOAD Rx, Ty, Rz in the example shown in FIG. 8 loads into the register Rx of the standard processing part SPP the variable Rz of the thread Ty executed in the auxiliary processing part APP. When the control unit ESCU decodes this instruction, it has to generate three commands:

1. Read(Rz): this command leads to reading in each of the auxiliary calculation units APU of the variable Rz of the auxiliary calculation unit APU.

2. Search(Ty): this command is send to the assignment and control unit ACU to identify which auxiliary calculation unit APU is executing the thread Ty. This identification is effected by means of a table of pages called the translation look-aside buffer (TLB) associating with each active thread in the assignment and control unit ACU the auxiliary calculation unit APU that is executing it. If that TLB does not send back the identifier of the calculation unit APU, the thread is not being executed and the task currently being executed in the standard processing part SPP is waiting. If the thread is being executed, the TLB sends back the identifier of the calculation unit APU that is executing it. That identifier is used in the standard processing part SPP to select the data to be sent to the auxiliary register queue of this auxiliary processing part [SPP]. This identifier can also be used by the auxiliary calculation units (APU) to validate (or not) reading data in the shared register queue SRF.

3. Write(Rx): this command leads to writing data returned by the auxiliary processing part APP in the register Rx of the auxiliary register queue.

Note that sending the command APUi to the auxiliary calculation units APU0, APU1, . . . , APUN-2, APUN-1 is optional and can be eliminated without disturbing the transfer mode. It does prevent access to register queues of no utility, however.

A dual mechanism transfers data from the standard processing part SPP to the auxiliary processing part APP. This mechanism is represented in FIG. 9, which is similar to FIG. 8, but with the instructions STORE Rx, Ty, Rz, Write(Rz) and Read(Rx) substituted for the instructions LOAD Rx, Ty, Rz, Read(Rz) and Write(Rx), respectively.

An embodiment is described below in which access to the system bus is via the main memory MM. The main memory controller MMC, the assignment and control unit (ACU), and the memory space controller MSC can be involved in the control of such communications, as a function of the type of communication used. Thus the main memory MM is involved in four types of communication:

1. System bus SB to main memory MM: this first type of transfer repatriates data from outside the system to the main memory MM of the auxiliary processing part APP. These transfers occur after decoding a special instruction in the control unit ESCU. That special instruction creates a data transfer operation assigned by the assignment and control unit ACU to the main memory controller MMC. The latter's behavior will then be comparable to that of a direct memory access (DMA) controller. At the same time, the main memory controller MMC fills in a table enabling it to establish the link between the data loaded and its position in the main memory MM.

2. Main memory MM to system bus SB: Symmetrically, data is transferred from the main memory MM to the remainder of the system following the arrival of a transfer operation identified by special instructions in the control unit ESCU. Sending from the main memory MM can furthermore be reflected in destruction of an entry in the table of correspondence if that data is a final result. This assumes that the special instructions decoded by the control unit ESCU authorize the distinction between destructive and non-destructive transfer.

3. Main memory MM to shared memory space SMS: if an auxiliary calculation unit APU attempts to access data that is not present in the shared memory space SMS, a transfer request is sent by the assignment and control unit ACU to the controller MMC in order to route that data into the shared memory space SMS. The auxiliary calculation unit APU is then blocked for the duration of the transfer.

4. Shared memory space SMS to main memory MM: these transfers follow transfers of special data from the auxiliary calculation units APU that specify the writing of a final result, i.e. that is not to be reread in the auxiliary processing part APP, in the shared memory space SMS. These transfers can also be operative in a situation of strong synchronization in the context of context saving. In this instance, the shared memory space SMS sends a transfer request via the assignment and control unit ACU to the main memory controller MMC.

As a function of the target application spaces, it is possible for the integration of a mass memory to be of no utility. This situation corresponds to circumstances where the mass memory MM is integrated into the shared memory space SMS on the same basis as any other memory resource. Under such circumstances, data is exchanged directly between the shared memory space SMS and the system bus. These exchanges are again managed in the form of communication threads, which can be executed in any of the auxiliary calculation units APU of the structure or preferably in a dedicated unit such as the main memory controller MMC.

The method of the present invention and likewise the architecture enabling it to be implemented can be extended, i.e. can support a variable number of auxiliary calculation units APU.

In practice, the performance of the architecture is nevertheless liable to suffer some degradation if the number of auxiliary calculations APU is too large, for example of the order of several hundred.

One way to solve this problem is to adopt the architecture of a shared memory multiprocessor system. One such embodiment is represented in FIG. 10, which shows by way of example only the association of two processors conforming to the invention, but could naturally comprise a greater number of associated processors all having cores with the same organization, centered on coupling a standard processing part SPP and an auxiliary calculation part APP, as described above, in particular with reference to FIG. 5.

Figure 10:
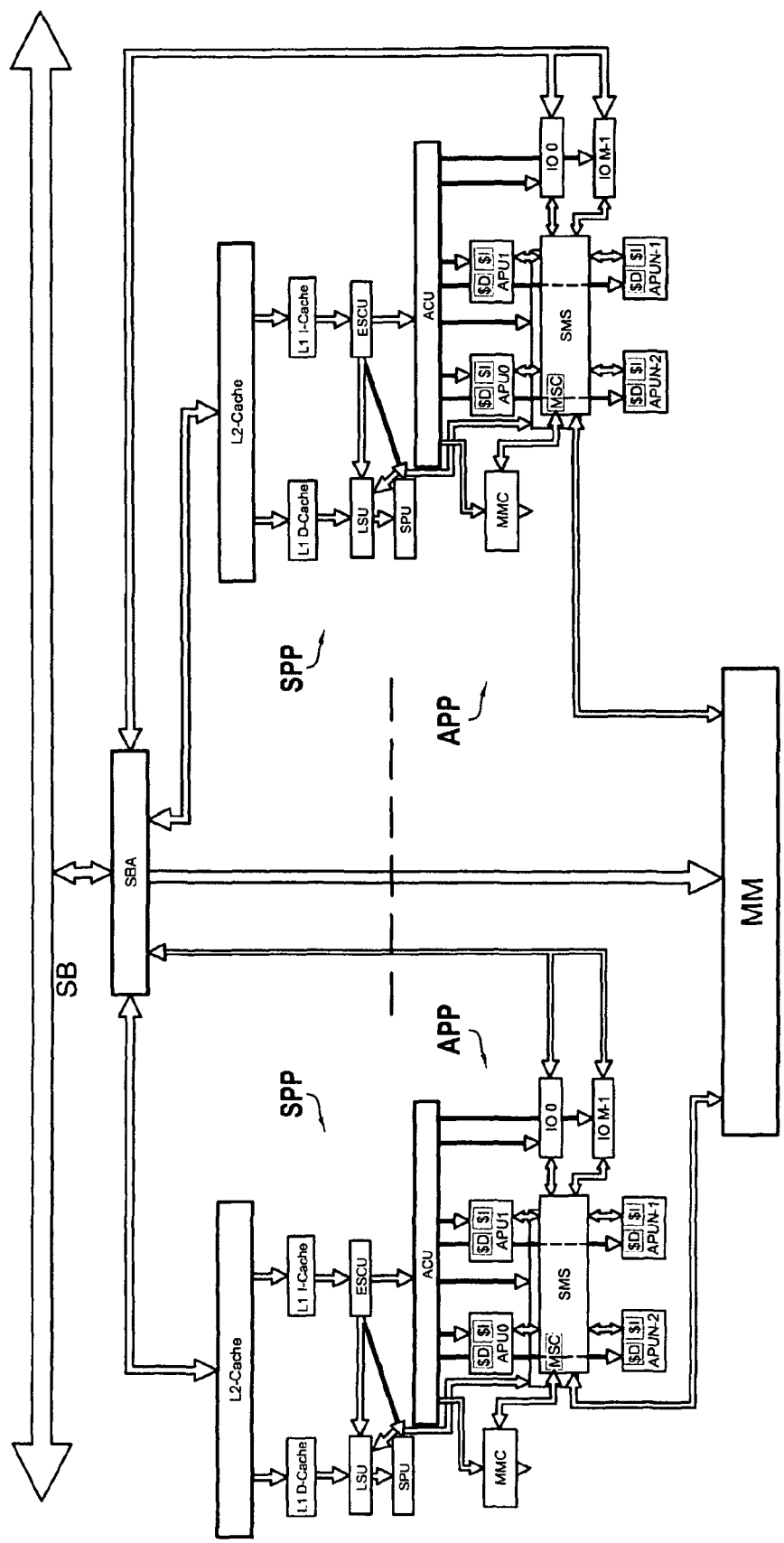
FIG. 10 is a block diagram of an example of a shared memory multiprocessor system implementing the invention.

However, in a shared memory multiprocessor system, it is advantageous to share certain elements such as the system bus arbiter SBA or the mass memory MM of the auxiliary processing parts APP, as represented in FIG. 10, or fast input/output controllers, which can also be shared between the cores via dedicated buses.

To summarize, the invention is essentially concerned with a device and a method of controlling and assigning threads in an embedded architecture, advantageously integrating multiple processing resources, dedicated to intensive multitask calculation and multistream calculation in real time.

More specifically, the real-time parallel calculator architecture comprises:
    a central processor core SPP responsible for executing non-critical processing of tasks and system software support;
    programmable, reconfigurable or dedicated auxiliary calculation units APU optimized for fast processing of certain operations;
    a memory space SMS shared by the auxiliary calculation units APU via an internal network;
    a unit ACU for controlling and assigning auxiliary resources, which manages the execution of intensive processing by the auxiliary calculation units APUi in parallel.

More particularly, communication between the various auxiliary calculation units APU, between the auxiliary calculation units APU and the central processor core SPP is effected via the shared memory space SMS and an internal network.

The method of assigning and processing tasks separates control tasks executed by the central processor core SPP from intensive calculation tasks executed by the dedicated calculation units APU. The assignment and control unit ACU manages the assignment of intensive calculation tasks to the various auxiliary calculation units APU working in parallel. This auxiliary controller ACU implements so-called weak synchronization mechanisms whereby the auxiliary calculation units APU can process threads of a task different from that executed on the central processor core SPP. The state of the system is then no longer represented by a unique context, unlike a von Neumann architecture. The time-critical inputs-outputs are linked directly to the shared memory space by the auxiliary calculation units APU. This architecture and this assignment method provide optimized real time multitask processing, i.e. with a reduction of data loading times, adaptable to different applications.

What is claimed is:

1. A system for conducting intensive multitask and multiflow calculation in real time, comprising:
    a central processor core for supporting the system software and comprising a control unit for assigning non-critical threads to the central processor core and intensive or specialized threads to an auxiliary processing part, a calculation unit, a memory unit and a loading unit, wherein the loading unit integrates an additional register queue for exchanging data between the central processor core and the auxiliary processing part;
    the auxiliary processing part comprising:
    a set of N auxiliary calculation units that are optimized for fast processing of certain operations,
    a memory space shared by the auxiliary calculation units via an internal network and
    an auxiliary control unit that is at least logically interposed between the central processor core and the auxiliary calculation units for assigning streams of individual instructions corresponding to intensive or specialized threads to the auxiliary processing units in parallel, and for controlling execution and synchronization of these streams of instructions and managing the execution contexts of the streams of instructions, such that a task being currently executed by the central processor core can continue without intervening in the management of the thread initiated and executed on the auxiliary processing part, wherein at least a portion of the communication between the various auxiliary calculation units or between those auxiliary calculation units and the central processor core is effected via the shared memory space and the internal network and wherein said system further comprises a mass memory for storing all data and programs manipulated by the auxiliary calculation units.

2. A system according to claim 1, further comprising a system bus connected to the central processor core.

3. A system according to claim 1, further comprising a main memory controller associated with the mass memory.

4. A system according to claim 1, wherein the auxiliary processing part further comprises time-critical input-output controllers interfaced to the auxiliary calculation units via the shared memory space.

5. A system according to claim 1, wherein the shared memory space further comprises multiple memory resources and an interconnection network for uniting the memory resources, wherein the memory resources store all data manipulated in the auxiliary calculation units.

6. A system according to claim 1, wherein the shared memory space further comprises a memory space controller for setting up a link between the calculation resources and the memory resources of the shared memory space.

7. A system according to claim 1, wherein the auxiliary calculation units comprise units selected from programmable units, reconfigurable units, and dedicated units.

8. A system according to claim 1, wherein the control unit includes additional instructions for controlling the auxiliary processing part.

9. A system according to claim 1, wherein the number N of auxiliary calculation units that at any time are each processing only one stream of individual instructions forming part of a task is optimized as a function of the application and is from 2 to 100.

10. A system according to claim 1, wherein the auxiliary control unit is further responsible for at least one management function selected from dynamic power management, fault management, and crisis mode management functions.

11. A system according to claim 2, further comprising a bus arbiter for managing communication between the system bus and the central processor core.

12. A system according to claim 3, further comprising a system bus connected to the central processor core and a bus arbiter for managing communication between firstly the system bus and secondly the central processor core and the mass memory.

13. A system according to claim 4, further comprising a system bus connected to the central processor core and a bus arbiter for managing communication between firstly a system bus and secondly the central processor core and the inputs-outputs.

14. A system according to claim 1, further comprising a set of processors connected to a system bus, each processor comprising a central processor core, a set of N auxiliary calculation units, a shared memory space, and an auxiliary resource assignment and control unit.

15. A system according to claim 14, further comprising a system bus arbiter shared between a number of processors for effecting the link with the system bus.

16. A system according to claim 14, wherein the mass memory is shared between a number of processors.

17. A method for conducting intensive multitask and multiflow calculation in real time using at least one processor comprising at least one central processor core, a control unit, a calculation unit, a memory unit, a loading unit, an auxiliary processing part comprising a set of N auxiliary calculation units, a memory space shared by the auxiliary calculation units via an internal network, and an auxiliary control unit that is at least logically interposed between the central processor core and the auxiliary calculation units, the method comprising:

using the control unit to assign non-critical threads of an application to the central processor core, using the control unit to assign intensive or specialized threads to the auxiliary processing part via the auxiliary control unit by parallel assignment of the streams of individual instructions corresponding to the intensive or specialized threads to the auxiliary calculation units optimized for fast processing of certain operations and controlling execution and synchronization of those streams of instructions and managing the execution contexts of those streams of instructions, continuing a task currently executed by the central processor core without intervening in the management of the thread initiated and executed on the auxiliary processing part, communicating at least some data between the various auxiliary calculation units or between those auxiliary calculation units and the central processor core via the shared memory space and the internal network, exchanging data between the central processor core and the auxiliary processing part via an additional register queue integrated in the loading unit and further comprising storing all the data and programs manipulated by the auxiliary calculation units in a mass memory.

18. A method according to claim 17, further comprising controlling the auxiliary control unit via the control unit by means of standard read/write instructions or standard exceptions.

19. A method according to claim 17, further comprising controlling the auxiliary control unit via the control unit by means of specialized instructions dedicated to communication and synchronization operations.

20. A method according to claim 17, processing only one stream of individual instructions forming part of a task on only one auxiliary calculation unit at a given time.

21. A method according to any one of claims 17 to 20, further comprising transmitting input-output signals in critical time to the auxiliary calculation units via the shared memory space.

22. A method according to claim 17, further comprising connecting the processor to a system bus.

23. A method according to claim 22, further comprising managing communication between the system bus, the central processor core, the input-output controllers or the mass memory with a bus arbiter.

24. A method according to any one of claims 17 to 20, further comprising processing a task assigned to the central processor core cycle by cycle on the same central processor core until a specialized instruction is reached;

decoding the specialized instruction and generating a command to the assignment and control unit;

creating a stream of instructions that is executed in one of the calculation units managed by the assignment and control unit; and continuing execution of the current task in the central processor core without intervention in the management of the stream of instructions initiated and executed in an auxiliary calculation unit.

25. A method for conducting intensive multitask and multiflow calculation in real time using at least one processor comprising at least one central processor core, a control unit, a calculation unit, a memory unit, a loading unit, an auxiliary processing part comprising a set of N auxiliary calculation units, a memory space shared by the auxiliary calculation units via an internal network, and an auxiliary control unit that is at least logically interposed between the central processor core and the auxiliary calculation units, the method comprising:

assigning non-critical threads of an application to the central processor core via the control unit, assigning intensive or specialized threads to an auxiliary processing part via the auxiliary control unit by parallel assignment of the streams of individual instructions corresponding to the intensive or specialized threads to the auxiliary calculation units optimized for fast processing of certain operations and controlling execution and synchronization of those streams of instructions and managing the execution contexts of those streams of instructions, continuing a task currently executed by the central processor core without intervening in the management of the thread initiated and executed on the auxiliary processing part, and communicating at least some data between the various auxiliary calculation units or between those auxiliary calculation units and the central processor core via the shared memory space and the internal network;

processing a task assigned to the central processor core cycle by cycle on the same central processor core until a specialized instruction is reached;

decoding the specialized instruction and generating a command to the assignment and control unit;

creating a stream of instructions that is executed in one of the calculation units managed by the assignment and control unit;

continuing execution of the current task in the central processor core without intervention in the management of the stream of instructions initiated and executed in an auxiliary calculation unit;

responding to an exception, an interrupt or a trap by implementing selective strong synchronization in which all components of the processor are synchronized; and exchanging data between the central processor core and the auxiliary processing part via an additional register queue integrated in the loading unit and further comprising storing all the data and programs manipulated by the auxiliary calculation units in a mass memory.

26. A method for conducting intensive multitask and multiflow calculation in real time using at least one processor comprising at least one central processor core, a control unit, a calculation unit, a memory unit, a loading unit, an auxiliary processing part comprising a set of N auxiliary calculation units, a memory space shared by the auxiliary calculation units via an internal network, and an auxiliary control unit that is at least logically interposed between the central processor core and the auxiliary calculation units, the method comprising:

assigning non-critical threads of an application to the central processor core via the control unit, assigning intensive or specialized threads to an auxiliary processing part via the auxiliary control unit by parallel assignment of the streams of individual instructions corresponding to the intensive or specialized threads to the auxiliary calculation units optimized for fast processing of certain operations and controlling execution and synchronization of those streams of instructions and managing the execution contexts of those streams of instructions, continuing a task currently executed by the central processor core without intervening in the management of the thread initiated and executed on the auxiliary processing part, and communicating at least some data between the various auxiliary calculation units or between those auxiliary calculation units and the central processor core via the shared memory space and the internal network;

processing a task assigned to the central processor core cycle by cycle on the same central processor core until a specialized instruction is reached;

decoding the specialized instruction and generating a command to the assignment and control unit;

creating a stream of instructions that is executed in one of the calculation units managed by the assignment and control unit;

continuing execution of the current task in the central processor core without intervention in the management of the stream of instructions initiated and executed in an auxiliary calculation unit;

responding to an interrupt or a trap by implementing weak synchronization in which only the context corresponding to the central processor core is synchronized while the auxiliary control unit continues to execute streams of instructions autonomously in the auxiliary calculation units; and exchanging data between the central processor core and the auxiliary processing part via an additional register queue integrated in the loading unit and further comprising storing all the data and programs manipulated by the auxiliary calculation units in a mass memory.

27. A method for conducting intensive multitask and multiflow calculation in real time using at least one processor comprising at least one central processor core, a control unit, a calculation unit, a memory unit, a loading unit, an auxiliary processing part comprising a set of N auxiliary calculation units, a memory space shared by the auxiliary calculation units via an internal network, and an auxiliary control unit that is at least logically interposed between the central processor core and the auxiliary calculation units, the method comprising:

assigning non-critical threads of an application to the central processor core via the control unit, assigning intensive or specialized threads to an auxiliary processing part via the auxiliary control unit by parallel assignment of the streams of individual instructions corresponding to the intensive or specialized threads to the auxiliary calculation units optimized for fast processing of certain operations and controlling execution and synchronization of those streams of instructions and managing the execution contexts of those streams of instructions, continuing a task currently executed by the central processor core without intervening in the management of the thread initiated and executed on the auxiliary processing part, and communicating at least some data between the various auxiliary calculation units or between those auxiliary calculation units and the central processor core via the shared memory space and the internal network;

processing a task assigned to the central processor core cycle by cycle on the same central processor core until a specialized instruction is reached;

decoding the specialized instruction and generating a command to the assignment and control unit;

creating a stream of instructions that is executed in one of the calculation units managed by the assignment and control unit;

continuing execution of the current task in the central processor core without intervention in the management of the stream of instructions initiated and executed in an auxiliary calculation unit;

responding to a local event in an auxiliary calculation unit by implementing selective local synchronization of the auxiliary calculation unit that is managed by the auxiliary calculation unit independently of the rest of the processor; and exchanging data between the central processor core and the auxiliary processing part via an additional register queue integrated in the loading unit and further comprising storing all the data and programs manipulated by the auxiliary calculation units in a mass memory.

28. A system according to claim 1, further comprising:
a main memory controller associated with the mass memory;
time-critical input-output controllers interfaced to the auxiliary calculation units via the shared memory space in the auxiliary processing part;
the shared memory space comprises multiple memory resources and an interconnection network for uniting all those resources, and in that this shared memory resource stores all data manipulated in the auxiliary calculation units;
the shared memory space further comprises a memory space controller for setting up a link between the calculation resources and the memory resources of the shared memory space;
the auxiliary calculation units comprise units selected from programmable units, reconfigurable units, and dedicated units;
the central processor core further comprises a calculation unit, a memory unit and a loading unit;
the control unit includes additional instructions for controlling the auxiliary processing part;
the loading unit integrates an additional register queue for exchanging data between the central processor core and the auxiliary processing part;
the number N of auxiliary calculation units that at any time are each processing only one stream of individual instructions forming part of a task is optimized as a function of the application and is from 2 to 100; and
the auxiliary resource assignment and control unit is further responsible for at least one management function selected from dynamic power management, fault management, and crisis mode management functions.

29. A system according to claim 28, further comprising:
a set of processors connected to a system bus, each processor comprising a central processor core, a set of N auxiliary calculation units, a shared memory space, and an auxiliary control unit; and
a system bus arbiter shared between a number of processors for effecting the link with the system bus,
wherein the mass memory is shared between a number of processors.

30. A method according to claim 21, further comprising connecting the processor to a system bus.

31. A system for conducting intensive multitask and multiflow calculation in real time, comprising:
a standard processing part that includes (a) a central processor core for executing calculation processing of tasks and task control, the calculation processing being not processed by an auxiliary processing part, (b) a control unit which processes additional instructions for requesting the execution of a certain calculation processing by the auxiliary processing part, (c) a calculation unit, (d) a memory unit and (e) a loading unit, wherein the loading unit integrates an additional register queue for exchanging data between the central processor core and the auxiliary processing part,
the auxiliary processing part includes (i) a set of N auxiliary calculation units which are each optimized for fast processing of the certain calculation processing and at a given time each process a stream of individual instructions belonging to a task, (ii) a unit for controlling and assigning the auxiliary resources which executes the parallel execution of processing which are divided into streams of elementary instructions assigned to auxiliary calculation units, and manages execution contexts of the streams of instructions, the management including the management of preemptions and the management of data transfers between the auxiliary calculation units, and (iii) a memory space shared by the auxiliary calculation units via an internal network, and wherein the various elements of the system are arranged in such a manner that a portion of the communication between the various auxiliary calculation units and the central processor core is effected via the shared memory space and the internal network,
further comprising a mass memory for storing all data and programs manipulated by the auxiliary calculation units.

32. A system according to claim 31, further comprising a main memory controller associated with the mass memory.

33. A system according to claim 31, wherein the auxiliary calculation units comprise programmable units, reconfigurable units, and dedicated units.

34. A system according to claim 31, wherein the central processor core further comprises a calculation unit, a memory unit and a loading unit.

35. A system according to claim 31, further comprising a bus arbiter for managing communication between firstly a system bus and secondly the central processor core as well as an input/output controller and the mass memory.

36. A system according to claim 31, further comprising a set of processors connected to a system bus, each processor comprising a central processor core, a set of N auxiliary calculation units, a shared memory space, and an auxiliary resource assignment and control unit.

37. A system according to claim 36, further comprising a system bus arbiter shared between a number of processors for effecting the link with the system bus.

38. A method for conducting intensive multitask and multiflow calculation in real time using at least one processor, comprising:

- at least a standard processing part comprising one central processor core, a calculation unit, a memory unit and a loading unit,
- an auxiliary processing part with a set of N auxiliary calculation units, a memory space shared by the auxiliary calculation units via an internal network,
- a control unit which processes additional instructions for requesting the execution of a certain calculation processing belonging to a task for the auxiliary processing part and the auxiliary calculation units, and
- an auxiliary resource assignment and control unit, wherein the central processor core is responsible for the execution of calculation processing of tasks, said calculation processing being not processed by the auxiliary processing part, and for the task control, whereas the auxiliary calculation units are each optimized for fast processing of the certain calculation processing and at a given time only a stream of elementary instructions belonging to a task, and the auxiliary resource assignment and control unit executes the parallel execution of processing which are divided into streams of elementary instructions assigned to the auxiliary calculation units and manages execution contexts of the streams of instructions, the management including the management of preemptions and the management of data transfers between the auxiliary calculation units, and wherein a portion of the communication between the various auxiliary calculation units or between those auxiliary calculation units and the central processor support is effected via the shared memory space and the internal network, the method further comprising exchanging data between the central processor core and the auxiliary processing part via an additional register queue integrated in the loading unit,
- wherein all the data and programs manipulated by the auxiliary calculation units are stored in a mass memory, wherein the processor is connected to a system bus and wherein access from the central processor core from input-output controllers and from the mass memory to the system bus is managed by a bus arbiter.

39. A method according to claim 38, wherein, each stream of individual instructions is executed on only one auxiliary calculation unit.

40. A method according to claim 38, wherein a task assigned to the standard processing part is processed cycle by cycle on the same standard processor part until a specialized instruction is reached that is decoded and generates a command to the assignment and control unit causing the creation of a stream of instructions that is executed in one of the calculation units managed by the assignment and control unit, whereas, once the specialized instruction has been decoded and the corresponding command generated, execution of the current task continues in the standard processing part, without intervention in the management of the stream of instructions initiated and executed in an auxiliary calculation unit.

41. A method according to claim 40, further comprising responding to trapping following an exception, an interrupt or a trap by implementing selective strong synchronization as a function of the type of trapping in which all components of the processor are synchronized.

42. A method according to claim 40, further comprising responding to trapping following an exception, an interrupt or a trap by selectively implementing weak synchronization as a function of the type of trapping, in which only the context corresponding to the standard processing part is synchronized while the auxiliary resource assignment and control unit continues to execute streams of instructions autonomously in the auxiliary calculation units.

43. A method according to claim 40, further comprising responding to trapping following a local event in an auxiliary calculation unit by implementing selective local synchronization whereby the auxiliary calculation unit concerned manages only the trapping and is synchronized independently of the rest of the processor.

* * * * *